Figure 1:
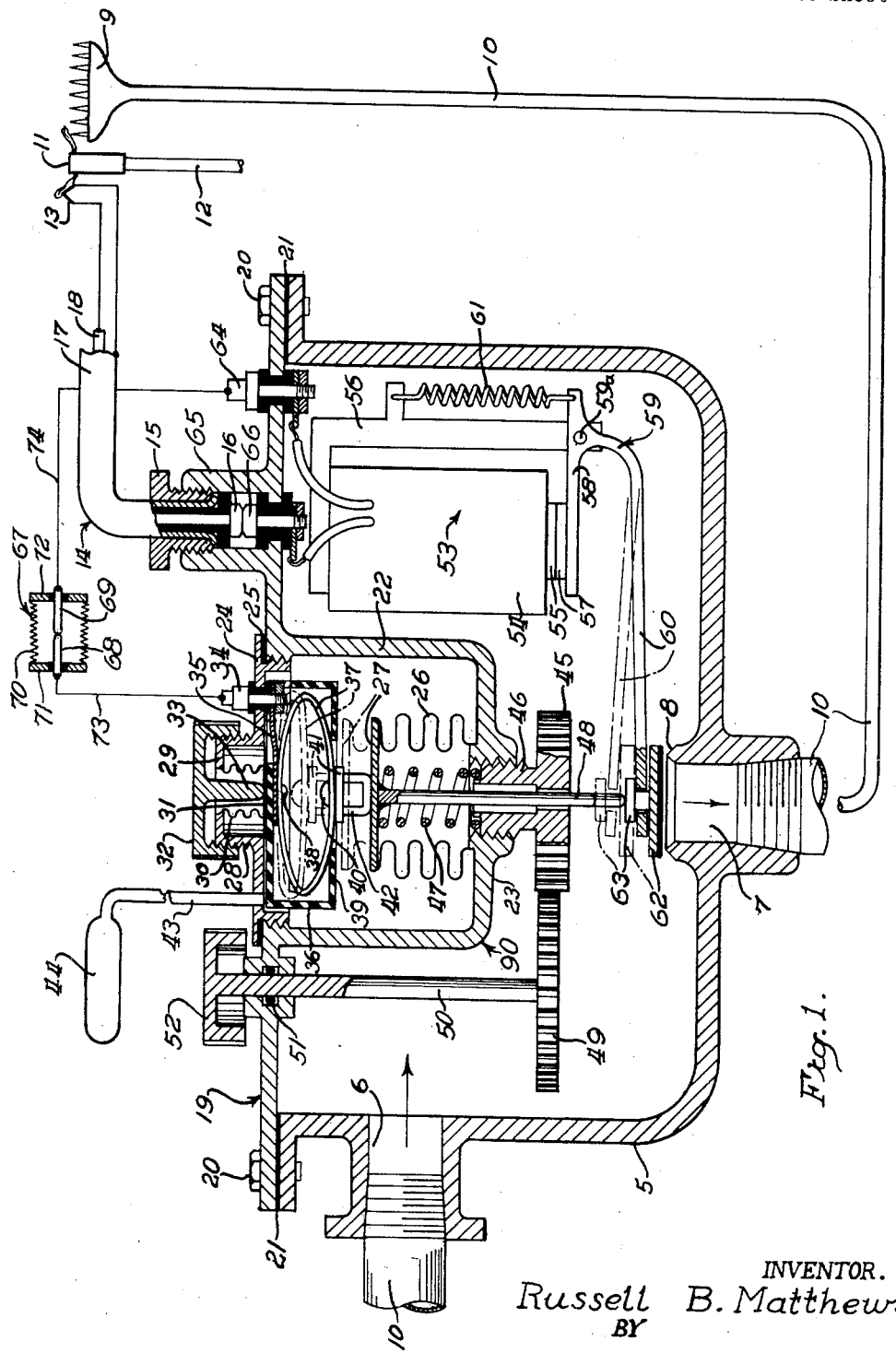

Oct. 23, 1956 R. B. MATTHEWS 2,767,923
MODULATING AND SHUT-OFF CONTROL APPARATUS
Filed July 20, 1953 2 Sheets-Sheet 1

INVENTOR.
Russell B. Matthews
BY
Seegert & Schwallbach
Attys.

United States Patent Office 2,767,923
Patented Oct. 23, 1956

2,767,923

MODULATING AND SHUT-OFF CONTROL APPARATUS

Russell B. Matthews, Wauwatosa, Wis., assignor to Milwaukee Gas Specialty Company, Milwaukee, Wis., a corporation of Wisconsin Application July 20, 1953, Serial No. 369,178

16 Claims. (Cl. 236—9)

This invention relates to improvements in modulating control apparatus, and more particularly to thermoelectrically powered modulating fuel control apparatus.

During normal operation of a fluid fuel burner a certain safe minimum amount of fuel is required for the maintenance of a flame. In order to safely ignite the burner, however, the latter must be supplied with fuel in substantially greater quantity than the aforementioned safe minimum.

With the above in mind it is an object of the present invention to provide an improved fuel control apparatus including condition responsive means for modulating the flow of fuel to a burner directly and continuously in accordance with changes in the condition, said apparatus also including means for shutting off the flow of fuel to the burner when the condition responsive means tends to restrict the fuel flow to below a minimum safe burning rate, said apparatus keeping the fuel flow shut off until said condition responsive modulating means thereafter permits sufficient fuel to flow for safe ignition of said fuel at the burner.

Another object of the invention is to provide an improved fuel control apparatus of the character described which operates entirely on thermoelectric power and which also provides safety shut-off of the main burner fuel on pilot failure.

Another object of the invention is to provide means by which certain existing thermoelectrically powered non-modulating fuel control installations can be quickly and easily provided with fuel modulating means.

Another object of the invention is to provide an improved modulating fuel control apparatus wherein the condition responsive modulating means includes an hermetically sealed enclosure having a movable portion and having a thermally expansible and contractible fill for moving said movable portion in response to changes in temperature, there being a connection between said movable portion and a flow controlling valve for moving the latter in a flow reducing direction in response to a rise in temperature and permitting movement of said valve in a flow increasing direction in response to a drop in temperature, there being thermoelectrically powered means under the control of a pair of coacting relatively movable contacts within said enclosure for effecting shut-off of the flow of fuel when said valve is moved in a flow reducing direction beyond a minimum safe flame setting, said means permitting fuel to again flow only after a drop in temperature in response to which said modulating means permits said valve to move to a safe ignition setting.

Another object of the invention is to provide an improved fuel control apparatus in one form of which a single valve is subject to actuation by the condition responsive modulating means as well as by a thermoelectrically powered valve operator, said operator having a resilient arm on which said valve is mounted for movement to an open position upon energization of the operator and to closed position upon deenergization, the resilience of said arm permitting fuel flow modulating movement of said valve by the condition responsive means when the operator is energized.

Another object of the invention is to provide an improved fuel control apparatus of the character described in another form of which there is a modulating valve actuated by the condition responsive modulating means only, and a shut-off valve actuated by the thermoelectric valve operator only, and an electrical interlock therebetween insuring safe minimum flow of fuel as well as safe ignition flow of fuel.

A more specific object of the invention is to provide an improved apparatus of the character described including an electrical interlock utilizing a pair of contacts within the hermetically sealed enclosure, the first of said contacts being movably mounted and biased toward a normal retracted position, and the second contact being connected to and movable with said movable enclosure portion, and being movable by contraction of the fill into engagement with said first contact when the latter is in its retracted position, said engagement completing the power circuit to the operator and moving the latter to flow permitting position, said contacts when engaged being movable together as a unit with said movable enclosure portion in response to expansion of the fill, there being means for limiting the unitary movement of said contacts and for disengaging the latter on predetermined expansion of said fill, said disengagement interrupting the power flow to the operator and moving the latter to flow preventing position, said first contact, upon disengagement, being returned to the normal retracted position toward which it is biased to thereby prevent reenergization of the operator and movement of the latter to flow permitting position until said second contact is again moved into engagement with the first contact by subsequent contraction of said fill in response to a drop in temperature through the modulating range.

Another object of the invention is to provide an improved apparatus of the character described wherein the ignition position of the fuel modulating valve is determined by the retracted position of contact which is biased toward said retracted position, and the minimum flow permitting position of said valve is determined by the position of the contacts at the instant of disengagement thereof, there being means for manually adjusting each of said valve posiitons, comprising means for adjusting the retracted position of said biased contact and means for adjusting the position of the stop means limiting the unitary movement of said contacts.

Another specific object of the invention is to provide an improved fuel control apparatus of the character described having manually operable modulating range adjustment means comprising a manually adjustable loading spring urging the movable enclosure portion in a fill compressing direction.

Another object of the invention is to provide an improved fuel control apparatus the differential of which is dependent upon the intensity of the magnetic attraction of the contacts.

Another object of the invention is to provide an improved fuel control apparatus of the character described wherein the fuel modulating means is responsive to temperature sensed by a bulb and which modulates the fuel flow in accordance with rate of heat loss from the space being heated, said apparatus also including a room thermostat in the power circuit to the operator, said thermostat being operable to overcall the fuel modulating means and stop the flow of fuel to the main burner in response to predetermined temperatures. For example, the thermostat may be set to shut off fuel flow when the room temperature reaches a predetermined maximum comfort level, even though the modulating means may still call for heat. On the other hand the thermostat may, for example on night turn-down, to be set to respond to a lower temperature, so that the room temperature cannot exceed the turn-down temperature setting even though the modulating means may be set to call for heat at said lower temperature.

Another object of the invention is to provide an improved thermoelectrically powered fuel control apparatus of the character described utilizing an encapsulated contact thermostat having high sensitivity and low differential characteristics, and which therefore requires no anticipating means, the fuel modulating means of said apparatus preventing too frequent cycling of said thermostat, as well as preventing overshooting of the room temperature.

Another object of the invention is to provide an improved fuel control apparatus of the character described which is compact, efficient in operation, and well adapted to mass production manufacture.

Other and further objects and advantages of the invention will become apparent as the description proceeds, reference being had to the accompanying drawings illustrating two forms of the invention.

Figure 2:
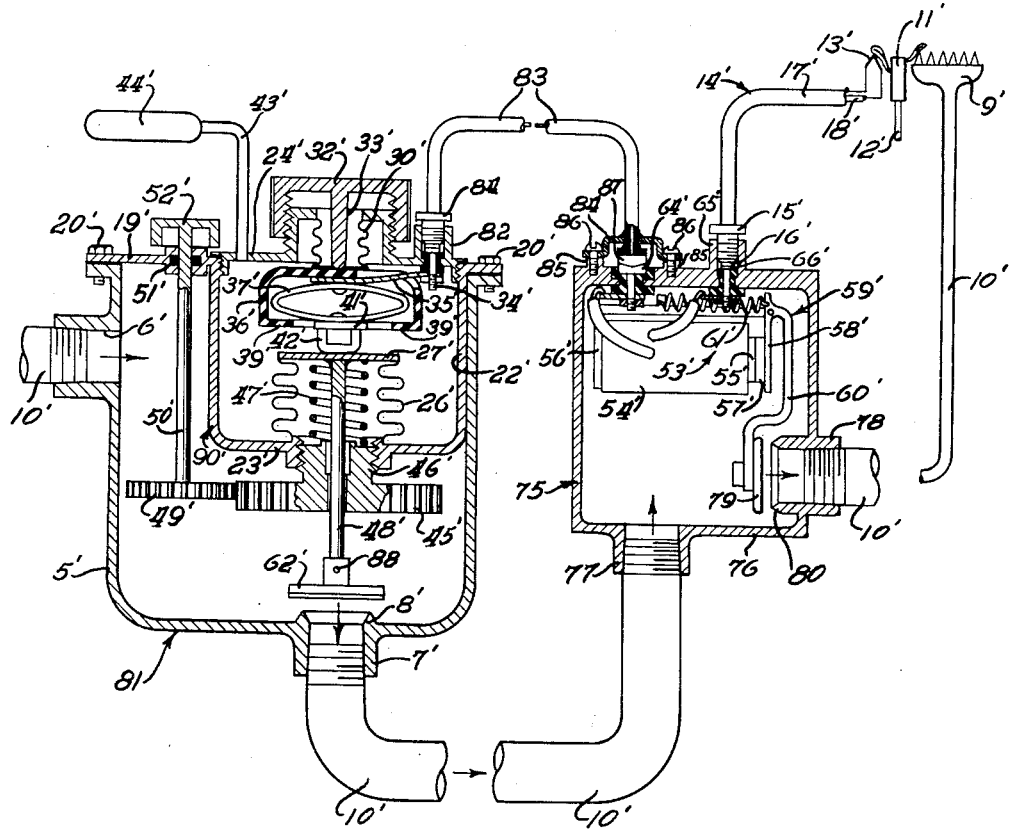

In the drawings:

Figure 1 is a semi-diagrammatic view of one form of the improved modulating fuel control apparatus illustrating the use of a single valve member for both fuel modulation and shut-off, parts of the valve body and of the mechanism therein being broken away and shown in vertical section; and Figure 2 is a semi-diagrammatic view similar to Figure 1 illustrating another form of the improved modulating fuel control apparatus utilizing separate modulating and shut-off valves.

Referring more particularly to Figure 1 of the drawing, the numeral 5 indicates a valve body or casing having an inlet 6 and an outlet 7, there being an annular valve seat 8 within the body 5 and surrounding the outlet 7 as shown. A main fuel burner 9 is supplied with fluid fuel through a supply pipe 10, contiguous sections of which are connected to the inlet 6 and outlet 7 of the valve body 5 as shown. A valve member 62 coacts with the seat 8 to control the flow of fuel to the burner 9, said valve being under the dual influence of a condition responsive modulating mechanism indicated generally by the numeral 90, and an electromagnetic operator 53, both of which, in the form of the invention shown in Figure 1, are disposed within the body 5.

The valve body 5 is provided with a cover 19 which carries the operator 53 and also forms a part of the modulating mechanism 90 which will now be described. The cover 19 is sealingly attached to said body 5, as by screws 20 and a gasket 21, and is formed with a cup-shaped depression or inner casing 22 having a centrally apertured bottom wall 23. A cover 24 closes the open upper end of the inner casing 22, said cover having a threaded connection with said casing and also being provided with a sealing gasket 25. An expansible and contractible bellows 26 has one end sealingly connected to the wall 23 around the central opening therein, said bellows having a movable portion or end wall 27. The bellows 26 and the cover 24 hermetically seal the inner casing 22. The cover 24 is provided with an upstanding externally threaded tubular extension 28 having a radially inwardly directed annular flange 29. A relatively small bellows 30 has one end sealingly connected to the inner periphery of the flange 29, said bellows extending within the tubular extension 28 and having a movable inner end wall 31. Threaded on the tubular extension 28 is a manually adjustable knob 32 having a projection 33 which is engageable with the wall 31 of the bellows 30 for a purpose to be hereinafter described.

A terminal post 34 insulatably extends through the cover 24 as shown, and a leaf spring 35 is fixed at one end to said post within the inner casing 22. A stop member 36, which may be cup-shaped, is made of electrical insulating material and is provided with a suitable opening through which the leaf 35 extends, said leaf being fixed to said stop member and to the upper stretch of an elliptical loop spring 37, as by a rivet 38. The leaf spring 35 supports the stop member 36 and spring 37. The open lower end of the stop member 36 is formed with a radially inwardly directed annular flange 39, and fixed to the lower stretch of the loop spring 37, as by a rivet 40, is a contact 41 made of magnetic material. A permanent magnet contact 42, which may be U-shaped as shown, is suitably fixed to the inner surface of the bellows wall 27 and is adapted to coact with the contact 41 in a manner to be hereinafter set forth. It is apparent that rotation of the knob 32 causes simultaneous axial movement of the stop member 36 and of the loop spring 37 with attendant deflection of the leaf spring 35. The leaf spring 35 urges the stop member 36 upwardly into engagement with the wall 31 of bellows 30.

A tube 43 provides communication between the interior of the casing 22 and a temperature sensing bulb 44 which may be located remote from the casing 22, for example in the cold air return of the heating unit with which the improved fuel control apparatus is associated.

The inner casing 22, tube 43 and bulb 44 may contain a volatile fluid fill which is expansible and contractible in response to temperature changes and which will not react with or cause film formation on the contacts 41 and 42. The specific fill used will vary with the temperature range in which improved apparatus is to operate. It is preferable, however, that the fill be of the sub-atmospheric type to provide fail-safe operation in the event of a leak in the bellows 26. The copending application of John A. Wolff, Serial No. 266,626, filed January 16, 1952, now Patent No. 2,719,202, discloses a number of sub-atmospheric fills which are suitable for use in the inner casing 22. Illustrative of such sub-atmospheric fills are isopentane, ether, isopropyl alcohol, N-propyl alcohol, isobutyl alcohol, N-butyl alcohol, isoamyl alcohol, M-xylene and P-cymeme. Where a sub-atmospheric is not desired, the fills mentioned in the copending application of Adolph J. Hilgert, Serial No. 265,445, filed January 8, 1952, now Patent No. 2,719,201, may be used. Illustrative of such fills are butane, iso-butane, and propane. It is understood, of course, that the fills mentioned herein are illustrative only, and that other suitable fills may be used.

The fill within the casing is expansible and contractible in response to temperature changes, thereby causing corresponding downward or upward movement of the bellows wall 27. The temperature range to which the modulating mechanism 90 is responsive is under the control of an adjustable range setting mechanism which includes a centrally bored gear 45 formed with an externally threaded tubular extension 46 which is threaded into the central aperture in the casing wall 23. Interposed between the inner end of the extension 46 and the bellows wall 27 is a coiled compression spring 47. A gear 49 meshes with the gear 45 and is fixed to a rotatable shaft 50 which is mounted in suitable bearings in the cover 19 as shown, there also being a sealing ring 51 surrounding the shaft 50 to insure against leakage. The shaft 50 is provided with an external knob 52. Manual rotation of the knob 52 causes rotation of the gears 49 and 45, and rotation of the latter gear results in axial movement thereof which increases or decreases the force exerted on the bellows wall 27 by the spring 47, depending upon the direction of rotation, thereby adjusting the temperature range to which the bellows 26 is responsive.

A force transmitting connection through which the valve 62 is actuated by the modulating mechanism 90 is provided by a plunger or rod 48 which is fixed at one end to a central portion of the bellows wall 27 and extends axially within the spring 47 and the bore of the gear 45. The plunger 48 extends below the gear 45 as shown and is positioned for engagement with the valve 62 as will hereinafter appear.

The electromagnetic operator 53 may be of the general type shown and described in the copending application for patent of Gerald E. Dietz and Adolph J. Hilgert, Serial No. 292,488, filed June 9, 1952. The structure of the operator 53 will not be described in detail herein, reference being had to the referred to application for that purpose. Suffice it to state for the purposes of the present application that the operator 53 includes an electromagnet 54 having pole pieces 55 and a frame 56, there being an armature 57 carried by an arm 58 of a pivotally mounted lever 59, said lever also having a resilient energy storing arm 60. A helical tension spring 61 is anchored to the frame 56 and urges the lever 59 about its pivot 59a in a counterclockwise direction, as viewed in Figure 1, thereby tending to pull the armature 57 away from the pole piece 55. A valve disk 62 may be loosely carried by the lever arm 60 in a position to coact with the seat 8 and thereby control the flow of fuel to the main burner 9. The valve disk 62 may have a head portion 63 on the opposite side of the arm 60, which head is engageable by the plunger 48 as shown.

When the operator 53 is deenergized, the valve 62 is held closed by the force of the spring 61 plus fluid pressure of the fuel line, and the armature 57 is spaced away from the pole piece 55. Upon energization of the operator 53 the armature is attracted to the pole piece 55 with a force which increases exponentially as the armature approaches the pole face. The initial attractive force on the armature is not sufficient to crack the valve 62 loose from the seat 8, so the initial movement of the armature toward the pole face results in pivoting of the lever 59 about its pivot 59a with simultaneous deformation of the arm 60 and storage of energy therein. As the armature moves close to the pole face 55 and therefore into the range wherein the electromagnet exerts its maximum attractive force, the force exerted on the armature plus the energy stored in the arm 60, is sufficient to crack the valve 62 from the seat 8, moving the latter to the dot-and-dash line position in Figure 1 as the arm 60 returns to its undeformed state.

External electrical connections for the operator 53 are provided by a terminal post 64 and a terminal tip 66. The terminal post 64 is insulatably mounted in the cover 19 as shown, and one end of the coil of the electromagnet 54 is connected thereto within the casing 5. The terminal tip 66 is insulatably mounted within an internally threaded socket 65 formed in the cover 19, and the other end of the coil of the electromagnet 54 is connected to said terminal tip within the casing 5 as shown.

The source of electric power for the electromagnetic operator 53 may be a thermoelectric generator 13, which in the illustrated embodiment, takes the form of a thermocouple. The thermocouple 13 is mounted adjacent a pilot burner 11 in a position to have its hot junction subject to the heat of the flame of said burner. The pilot burner 11 is, in turn, mounted adjacent the main burner 9. A concentric thermocouple lead 14 has a tubular metallic outer conductor 17 and an inner conductor 18 connected respectively to the terminals of the thermocouple 13. The lead 14 also has a connector nut 15 in circuit with the outer conductor 17 and a terminal tip 16 in circuit with the inner conductor 18, said connector nut being threaded into the socket 65 as shown, to effect a low resistance connection between the terminal tips 16 and 66, as well as to ground the outer thermocouple lead conductor 17 to the cover 19. The thermocouple 13 and lead 14 are preferably of the type shown in the Oscar J. Leins Patent No. 2,126,564, issued August 9, 1938.

The electrical circuit of the improved control apparatus may also include a room thermostat 67 having contacts 68 and 69 encapsulated within an expansible and contractible enclosure 70, which enclosure may take the form of a bellows having a thermally expansible and contractible volatile fluid fill therein. The contacts 68 and 69 are fixed respectively to relatively movable end walls 71 and 72. The contact 68 is connected in circuit with the terminal post 34 as by a conductor 73, and the contact 69 is connected with the terminal post 64, as by a conductor 74. The thermostat 67 may be of the general type shown and described in the copending application for patent of Adolph J. Hilgert, Serial No. 291,047, filed May 31, 1952, now Patent No. 2,724,030. When the temperature sensed by the bellows 70 is below that for which the thermostat 67 is set, the conductors 68 and 69 are in engagement, and thermoelectric current from the thermocouple 13 can flow therethrough. However, when the temperature sensed by the bellows 70 rises above that for which the thermostat 67 is set, the fill in said bellows expands and the contact pressure between the contacts 68 and 69 is decreased, at least sufficiently to interrupt or decrease the flow of thermoelectric current therethrough to a value less than the drop-out voltage necessary to hold the operator 53 in, thereby deenergizing the operator 53 and closing the valve 62 to shut off all fuel flow to the main burner 9.

The pilot burner 11 is supplied with fuel through a pipe 12 which may be connected to any suitable source (not shown). Where 100 percent shut-off of the fuel is desired, a thermoelectrically powered pilot line safety shutoff valve (not shown) may be used in the line 12. A valve of this type is shown in the copending application for patent of Gerald E. Dietz and Adolph J. Hilgert, Serial No. 292,488, filed June 9, 1952.

In the electrical circuit of the improved control apparatus the generator 13, electromagnet operator 53, thermostat 67, and contacts 41 and 42 of the condition responsive means are in serious circuit relationship. Thus, if the circuit is broken at either the contacts 41 and 42, or at the contacts 68 and 69, the operator 53 is thereby deenergized and closes the valve 62. When the circuit is completed, current can flow from the generator 13 through the inner lead conductor 18 and terminals 16 and 66, to and through the coil of the operator 53, thence through the terminal post 64, conductor 74, contacts 68 and 69, and conductor 73 to the terminal post 34. The current can flow from the post 34 through the leaf spring 35, loop spring 37 and contacts 41 and 42 to ground on the bellows 26 and cover 19. The current can return to the generator 13 through the ground circuit including the cover 19, thermocouple lead connector nut 15 and the outer thermocouple lead conductor 17.

The operation of the improved control apparatus is as follows: Assume that the pilot burner 11 is ignited, and the thermocouple 13 is generating electricity, but that the contacts 41 and 42 are not in engagement. In this situation no energizing current can flow to the electromagnet 54, and therefore the force of the spring 61 plus fuel pressure holds the valve disk 62 against the seat 8 to prevent fuel flow to the main burner 9. The normal unstressed position of the loop spring 37 is shown in dot and dash lines in Figure 1, the corresponding position of the contact 41 also being shown in dot and dash lines. Since the burner 9 is not ignited, it is assumed that the temperature sensed by the bulb 44 drops, thereby causing contraction of the fill within the inner casing 22. The force of the spring 47 plus the inherent spring force of bellows 26 moves the bellows wall 27, contact 42 and plunger 48 upwardly as viewed in Figure 1. At a predetermined temperature, contraction of the fill moves the contact 42 into engagement with the contact 41 while the latter is disposed in its retracted dot-and-dash line position.

Engagement of the contacts 41 and 42 completes the thermoelectric circuit and energizes the electromagnet 54, whereupon the latter draws the armature 57 to the pole piece 55, thereby pivoting the lever 59 in a counterclockwise direction as viewed in Figure 1 and as described hereinbefore. During this pivotal movement the arm 58 is moved to the position shown, while the arm 60 and valve 62 are moved to the dot-and-dash line position shown, thereby permitting gas flow to the main burner 9 for ignition by the pilot burner 11. The movement of the arm 60 may be such that the head 62 engages the plunger 48 when the operator 53 is energized, in which case the normal retracted position of the contact 41 determines the ignition position to which the valve 62 is moved by engagement of the contacts and resultant energization of the operator 53. This valve opening can be adjusted by rotation of the knob 32, which in turn, raises or lowers a normal retracted position of the contact 41 by raising or lowering the leaf spring 37. When the valve 62 is in dot-and-dash line position, fuel can flow to the main burner 9 in a sufficient quantity for safe ignition.

As the fuel is burned at the burner 9, the temperature sensed by the bulb 44 rises, and the fill within the casing 22 expands, forcing the bellows wall 26 downwardly, as viewed in Figure 1. This movement not only pulls the contact 41 downwardly with contact 42, thereby extending the loop spring 47, but it also moves the plunger 48 downwardly, causing the latter to push the valve 62 toward the seat 8, simultaneously deforming the resilient arm 60 of the lever 59. Deformation of the arm 60 by the plunger 48 tends to pull the armature 57 from the pole piece 55, but such disengagement is prevented by the energization of the electromagnet 54. The flow of fuel to the burner 9 is gradually reduced as the valve 62 is pushed toward the seat 8 in response to a rise in the temperature sensed by the bulb 44, thereby providing modulation of the fuel flow in accordance with the temperature.

As pointed out previously herein, there is a minimum fuel flow rate below which it is impossible to maintain a safe flame at the burner 9. In the form of the invention selected for illustration this minimum safe fuel flow rate occurs when the valve 62 is in the solid line position shown. Since it is unsafe for the valve 62 to be disposed in an open position closer to the seat 8 than its solid line position, the stop 36 is so disposed that any rise in temperature sensed by the bulb 44 which moves the bellows wall 27 below its solid line position, pulls the contact 42 out of engagement with the contact 41. This disengagement occurs because the stop 39 is engaged by the loop spring 37 when the contact 41 is in the solid line position shown, and said contact is thereby prevented from moving downwardly with the contact 42 beyond said solid line position.

Disengagement of the contacts 41 and 42, of course, breaks the thermoelectric circuit and deenergizes the operator 53, whereupon the spring force of the spring 61 and the fuel pressure snaps the valve 62 onto the seat 8, thereby shutting off the fuel flow to the burner 9. As soon as the contact 41 is disengaged from the contact 42, the loop spring 37 snaps upwardly to its normal unstressed position and simultaneously moves the contact 41 to its dot-and-dash line retracted position.

The minimum safe flow permitting position of the valve 62, shown in solid lines, is controlled by the position of the stop member 36, since said stop limits the movement of the contact 41 with the contact 42. In the form of the invention selected for illustration the minimum flow permitting position of the valve 62 is adjusted by adjusting the position of the stop member 36 by rotating the knob 32. This rotation simultaneously adjusts the ignition position of the valve 62 by adjusting the position of the loop spring 37 and contact 41. It is obvious, however, that the spring 37 and the stop member 36 may be mounted for separate adjustment if desired. As pointed out previously, the throttling temperature range can be varied by rotating the knob 32 to increase or decrease the spring force against the bellows wall 27, depending upon the direction of rotation of said knob.

As the temperature surrounding the bulb 44 drops, after extinguishment of the main burner 9, the fill within the casing 22 contracts and the bellows wall 27, along with contact 42 and plunger 48, move upwardly away from the closed valve 62 until the contact 42 re-engages the contact 41 when the latter is in its retracted position. This contact engagement causes energization of the operator 53, which in turn, snaps the valve 62 to the dot-and-dash line position shown. It will be noted that the valve 62 cannot be opened by the operator 53 until the plunger 48 has been lifted by the bellows wall 27 to a position where it permits initial movement of said valve to its dot-and-dash line ignition position upon reenergization of the operator 53. An electrical interlock between the operator 53 and the modulating means 90 is thus afforded.

If during operation of the improved control apparatus the temperature surrounding the thermostat 67 should exceed the temperature for which said thermostat is set, the fill in said thermostat expands the bellows 70 and tends to move the contacts 68 and 69 apart at least sufficiently to interrupt the flow of thermoelectric current therebetween as aforedescribed. Interruption of the thermoelectric current causes deenergization of the operator 53 and closure of the valve 62. The thermostat 67 can thus overcall the fuel modulating means 90 to stop the flow of fuel to the main burner 9 in response to a predetermined condition, such as temperature. The thermostat 67 may be set to shut off fuel flow when the room temperature reaches a predetermined maximum comfort level, even though the modulating means 90 may be calling for heat. This is particularly useful in preventing overheating in the spring and fall when the heat loss rate of a building may vary greatly as a result of frequent fluctuations in outside temperature.

The thermostat 67 may also, for example on night turn-down, be set to respond to a lower temperature to prevent the room temperature from exceeding the turn-down temperature for which the thermostat is set, even though the modulating means is set to call for heat at said turn-down temperature. The overcalling action of the thermostat 67 thus permits control of room temperatures without adjustment of the modulating means. This is particularly advantageous where the modulating means is located in the basement and is not as readily accessible as the room thermostat.

The encapsulation of the contacts 41 and 42 and the contacts 68 and 69 within hermetically sealed enclosures prevents contamination thereof so that the contact resistance remains substantially constant and low enough to permit operation of the improved apparatus on thermoelectric current. The thermostat 67 has high sensitivity and low differential characteristics and therefore requires no anticipating means. On the other hand, the fuel modulating means prevents too frequent cycling of the sensitive thermostat as well as preventing overshooting of the temperature.

Safety shut-off in the event of pilot failure is accomplished as follows: Upon extinguishment of the pilot burner flame, the thermocouple 13 cools and ceases to generate thermoelectric current, thereby deenergizing the operator 53, which, in turn, snaps the valve 62 closed.

When a sub-atmospheric fill is used in the casing 22, fail-safe operation is provided by reason of the fact that a leak in the bellows causes the wall 27 to be moved downwardly to separate the contacts 41 and 42, thereby causing deenergization of the operator 53 and closure of the valve 63.

Figure 2 illustrates another form of the improved modulating fuel control apparatus utilizing a modulating valve and a separate shut-off valve. The form of the invention shown in Figure 2 has a number of parts which are similar to corresponding parts of the form of the invention shown in Figure 1. In Figure 2 the parts indicated by primed numerals are similar to corresponding parts in Figure 1 indicated by the same numerals unprimed.

In Figure 2 the shut-off valve is indicated by the numeral 75 and may be of the thermoelectrically powered cycling type shown in the aforementioned copending application for patent of Gerald E. Dietz and Adolph J. Hilgert, Serial No. 292,488, filed June 9, 1952. The valve 75 has a casing 76 provided with an inlet 77 and an outlet 78 to which contiguous sections of the fuel supply pipe 10' are connected. The valve 75 has an electromagnetic valve operator 53' similar to the valve operator 53 in Figure 1. The arm 60' carries a valve disk 79 which cooperates with an annular valve seat 80 to control the flow of fuel to the burner 9'.

The valve body 76 is provided with a socket 69' for receiving the nut 15' of the concentric lead 14', said connections effecting engagement of the terminal tips 16' and 66', the latter being connected in circuit with one side of the coil of the electromagnet 54'. The other side of the coil of the electromagnet 54' is connected in circuit with the insulatably mounted terminal tip 64' which is exposed externally of the casing 76.

Certain existing non-modulating fuel control apparatuses include elements such as the valve 75, thermocouple 13', pilot burner 11', and main burner 9'. In such installations an encapsulated contact room thermostat (not shown) similar to the thermostat 67 of Figure 1 is provided for cycling the valve 75 in response to fluctuations in temperature. One contact of such a thermostat may be connected in circuit with the terminal tip 64', and the other contact grounded to the valve body 76 as shown in the aforementioned application Serial No. 292,488. An existing fuel control system of this type can be readily provided with modulation by associating the modulating valve 81 with the valve 75 to thereby form the improved modulating fuel control apparatus illustrated in Figure 2.

In associating the valve 81 with the valve 75 in the manner shown in Figure 2, the inlet 6' and outlet 7' of the valve body 5' are connected to contiguous sections of the pipe 10'. The cover 24' is provided with an internally threaded socket 82 within which a terminal tip 34' is insulatably mounted. A concentric lead 83 similar to the leads 14 and 14' has a connector nut 84 threaded into the socket 82 to effect engagement of the center conductor of the lead 83 with the terminal tip 34' as shown. The other end of the lead 83 is provided with a bracket 84 which, upon removal of the thermostat (not shown) from the mounting posts 85, is connectable to said mounting posts, as by screws 86, there being a terminal tip 87 in circuit with the inner conductor of the lead 83, and attachment of the bracket 84 effecting a low resistance connection between the terminal tips 87 and 64'. The outer conductor of the lead 83, of course, is grounded to the valve body 76 through the barcket 84, while the outer conductor 17' of the lead 14' is also grounded to the valve body 76 through the bracket 84, while the outer Figure 2, it is obvious that such a thermostat may, if desired, be employed in this circuit in the same manner as in the form of the invention shown in Figure 1, by suitably connecting said thermostat in the series circuit as aforementioned.

The operation of the form of invention shown in Figure 2 is substantially the same as that of the form shown in Figure 1, except for the fact that the plunger 48' actuates the valve 62' only. It will be noted that the valve disk 62' is fixed to the end of the plunger 48', as by a pin 88, said valve being modulated through a substantial range of open positions and normally never closing entirely. On the other hand, the valve disk 79 is positioned by the operator 53' in either full open or closed positions, the valve 75 providing a shut-off function only.

In Figure 2 current from the generator 13' can flow through to the conductor 18' of the lead 14', through the contact tips 16' and 66', to the electromagnet 54' of the operator 53'. From the electromagnet 54 the current flows through the terminal tips 64 and 87 to the inner conductor of the lead 83, and thence to the terminal tip 34', leaf spring 35', loop spring 37', and conductors 41' and 42', to ground on the bellows wall 27'. The current flows through the ground, i. e., casing 22', cover 24', the outer conductor of lead 83', valve body 76, and the outer conductor 17' of the lead 14', back to the thermocouple 13' to complete the circuit.

In Figure 2 the modulating valve 62' is shown in an intermediate position with contacts 41' and 42' engaged to complete the thermoelectric current. Assuming that the pilot burner 11' is ignited, the operator 53' is energized, thereby holding the armature 57' to the pole piece 55', and holding the valve disk 79 in the open position shown. The casing 22', tube 43' and bulb 44' contain a temperature responsive expansible and contractible volatile fluid fill of the same type used in the casing 22 of the form of the invention shown in Figure 1. The increase in temperature sensed by the bulb 44' as a result of the burning of the fuel at the main burner 9', causes said fill to expand and force the bellows wall 27', magnet 42', plunger 48' and valve disk 62' downwardly, pulling the loop spring 37' into engagement with the flange 39' of the stop 36'. Continued downward movement of the bellows wall 27' after engagement of the spring 37' with the flange 39' causes disengagement of the contact 42' from contact 41', thereby interrupting the thermoelectric current flow and deenergizing the operator 53', whereupon the spring 61' and the fuel pressure snap the disk 79 onto the seat 80 and stop the flow of fuel of the main burner 9'. Thus an electrical interlock similar to that of Figure 1 is provided as between the modulating valve 62' and operator 53'.

The point of disengagement of the contacts 41' and 42' determines the effective minimum flow permitting position of the valve 62', and this position is, in turn, determined by the position of the stop 36'. The position of the stop 36', and hence the effective minimum flow permitting position of the valve 62', can be readily adjusted by rotating the knob 32'.

Upon disengagement of the contact 41' from contact 42', the spring 37' returns to its unstressed condition, thereby lifting the contact 41' to its retracted position corresponding to that of the contact 41 shown in Figure 1. The retracted position of the contact 41' determines the ignition position of the valve 62', as will hereinafter appear.

As the temperature sensed by the bulb 44' drops after shut-off of the main burner 9', the fill within the casing 22' contracts, permitting the bellows wall 27' to be moved upwardly by the spring 47' and the spring force of the bellows 26', drawing with it the plunger 48' and valve disk 62'. By the time the bellows wall 27' has moved the contact 42' into engagement with the contact 41' when the latter is in its retracted position, said bellows wall has also moved the valve disk 62' away from the seat 8' to an ignition position permitting sufficient fuel to flow through the outlet 7' for safe ignition of the burner 9' upon completion of the circuit and the resultant opening of the valve 79 by energization of the operator 53'. Since the retracted position of the contact 41' determines the ignition position of the valve 62', said valve position can also be readily adjusted by rotating the knob 32', which in turn, adjusts the retracted position of the contact 41'.

The throttling temperature range of the valve 81 may be readily adjusted by rotation of the knob 52', thereby adjusting the spring force on the bellows wall 27', said adjustment means being the same as that shown in Figure 1.

While a specific type of electromagnetically operated shut-off valve 75 has been illustrated in Figure 2, any suitable electro-responsive shut-off valve may be used. For example, the shut-off valve 75 may be of the diaphragm type, in which case the operator 53' could control bleed ports, which in turn, control the actuation of the diaphragm of the said valve.

As in the form of the invention shown in Figure 1, the form of the invention shown in Figure 2 also provides safety shut-off of the fuel upon outage of the pilot burner 11', such pilot failure causing cooling of the generator 13', deenergization of the operator 53', and seating of the valve disk 79.

In both forms of the invention illustrated the temperature differential required to separate the magnetic contacts is dependent upon the strength of the magnetic attraction between the contacts 42 and 42'. It is therefore desirable to utilize magnetic contacts 42 and 42' which are sufficiently strong to draw the cooperating contact 41 or 41' down to the pull-off point, but not so strong as to require a substantial rise in temperature after the contacts have reached the pull-off point, in order to disengage said contacts. The preferable magnetic contacts 42 and 42', therefore, make a minimum contribution to the differential of the apparatus.

The forms of the invention selected for illustration are for the purposes of disclosure only and are not intended to define the limits or scope of the invention. Various changes and modifications may be made without departing from the spirit of the invention, and all of such changes are contemplated as may come within the scope of the claims.

What is claimed as the invention is:

1. A condition responsive control device comprising: a sealed chamber having a condition responsive fill, said chamber having a portion movable with expansion and contraction of said fill in response to the condition; a first contact member biased to a first position; a second contact member movable into engagement with said first contact member when the latter is in its said first position, said contact members when in engagement being movable as a unit away from said first position with movement of the movable portion of said chamber in response to changes in the condition; and a stop limiting said unitary movement of the contact members beyond a limit, further movement of said movable portion of said chamber beyond said limit effecting disengagement of said contact members and return of said first contact member to its said first position.

2. A condition responsive control device comprising: a sealed chamber having a condition responsive fill, said chamber having a portion movable with expansion and contraction of said fill in response to the condition; a first contact member biased to a first position; a second contact member movable into engagement with said first contact member when the latter is in its said first position, said contact members when in engagement being movable as a unit away from said first position with movement of the movable portion of said chamber in response to changes in the condition; a stop limiting said unitary movement of the contact members beyond a limit, further movement of said movable portion of said chamber beyond said limit effecting disengagement of said contact members and return of said first contact member to its said first position; and means for adjusting the position of said stop and hence the limit of said unitary movement.

3. A condition responsive control device comprising: a sealed chamber having a condition responsive fill, said chamber having a portion movable with expansion and contraction of said fill in response to the condition; a first contact member biased to a first position; a second contact member movable into engagement with said first contact member when the latter is in its said first position, said contact members when in engagement being movable as a unit away from said first position with movement of the movable portion of said chamber in response to changes in the condition; means for magnetically latching said contact members together for said unitary movement, said means being independent of the current flow through said contacts; and a stop limiting said unitary movement of the contact members beyond a limit, further movement of said movable portion of said chamber beyond said limit effecting unlatching and disengagement of said contact members and return of said first contact member to its said first position.

4. A condition responsive control device comprising: a sealed chamber having a condition responsive fill, said chamber having a portion movable with expansion and contraction of said fill in response to the condition; a first magnetic contact member biased to a first position; a second magnetic contact member movable into engagement with said first contact member when the latter is in its said first position, said contact members when in engagement being magnetically latched together and movable as a unit away from said first position with movement of the movable portion of said chamber in response to changes in the condition; and a stop limiting said unitary movement of the contact members beyond a limit, further movement of said movable portion of said chamber beyond said limit effecting disengagement of said contact members and return of said first contact member to its said first position.

5. Condition responsive control apparatus for controlling flow of fuel to a fuel burner comprising: condition responsive means; fuel control means under the control of said condition responsive means for modulating the flow of fuel in accordance with changes in the condition between a safe ignition and minimum safe flow point of said control means; electromagnetic operating means also controlling said fuel control means for movement thereof to flow-preventing position when deenergized and to flow-permitting position when energized; and an electrical interlock between said condition responsive means and said electromagnetic means, said interlock comprising a pair of cooperating contacts under the control of said condition responsive means effective to energize said electromagnetic operating means when placed in engagement by said condition responsive means and movable as a unit with movement of said fuel control means between said safe ignition and minimum safe flow points, said contacts being disengaged for deenergization of said electromagnetic operating means and movement of said fuel control means to flow-preventing position with movement of the latter beyond said minimum safe flow position.

6. In a control device: a movably mounted control member for controlling main fuel flow and having an ignition position and a minimum flow permitting position; ignition means for said main fuel; a thermoelectric generator subject to the heat of said ignition means; an hermetically sealed enclosure having a movable portion; a condition responsive expansible and contractible fluid fill in said enclosure operable to move said movable portion with expansion and contraction of said fill; a connection between said movable portion and said control member operable to move the latter in a flow reducing direction when said movable portion is moved by expansion of said fill; a pair of cooperating movable low resistance contacts within said enclosure, one of said contacts being connected to and movable with said movable portion into engagement with the other contact by movement of said movable portion to a position permitting movement of said control member to said ignition position, said contacts when in engagement being movable as a unit with movement of said movable portion by expansion of the fill, and said contacts being positioned for disengagement by movement of said movable portion tending to move said control member in a flow reducing direction past said minimum flow permitting position; and an electric-responsive control member operator, a low resistance circuit connecting said operator and said contacts with said thermoelectric generator for energization of said operator by current from said generator, said operator having an energized flow permitting position in which it is normally disposed when said contacts are engaged, and said operator also having a deenergized flow preventing position to which it is moved by disengagement of said contacts.

7. In a control device: a movably mounted control member having an ignition position and a minimum flow permitting position; an hermetically sealed enclosure having a movable portion; a condition responsive expansible and contractible fluid fill in said enclosure operable to move said movable portion with expansion and contraction of said fill; a connection between said movable portion and said control member operable to move the latter in a flow reducing direction when said movable portion is moved by expansion of said fill; a first contact connected to and movable with said movable portion; a second contact biased toward a normal retracted position and movable to a predetermined extended position, said movable portion and first contact being movable by contraction of said fill to a position where said first contact engages said second contact when the latter is in its normal retracted position with accompanying movement of said control member to said ignition position; means magnetically latching said engaged contacts together to move said second contact with said first contact and movable portion against the bias of said second contact during expansion of said fill, said means being independent of the current flow through said contacts and any expansion of said fill which moves said second contact with said first contact beyond said predetermined extended position causing disengagement of said contacts at a point where said control member has also been moved in a flow reducing direction to said minimum flow permitting position, said second contact upon disengagement returning to the normal retracted position toward which it is biased, thereby preventing reengagement of said contacts until said fill has contracted sufficiently to permit said control member to be moved to its ignition position.

8. In a control device: a movable mounted control member having an ignition position and a minimum flow permitting position; condition responsive means comprising an hermetically sealed enclosure having a movable portion; and a condition responsive expansible and contractible fluid fill in said enclosure operable to move said movable portion during expansion and contraction of said fill; connections between said movable wall and said control member operable to move the latter in a flow reducing direction when said movable portion is moved by expansion of said fill; electromagnetic operating means also controlling said control member for movement thereof to flow preventing position when deenergized and flow permitting position when energized, and an electrical interlock between said condition responsive means and said electromagnetic operating means comprising a first contact connected to and movable with said movable wall; a movably mounted second contact biased toward a normal retracted position, said movable portion and said first contact being movable by contraction of the fill to a position where said first contact engages said second contact when the latter is in its normal retracted position for energization of said electromagnetic operating means, the corresponding position of said control member connection upon said contact engagement defining the ignition position of said control member, means magnetically latching said contacts together when moved into engagement, said contacts after engagement being movable together as a unit against the bias of said second contact away from said retracted position with said movable portion during expansion of said fill; a stop limiting said unitary movement and causing disengagement of said contacts upon predetermined movement of said control member in a flow reducing direction for deenergization of said electromagnetic operator and movement of said control member to flow preventing position, said stop defining said minimum flow permitting position of said control member, said second contact upon disengagement being returned to the normal retracted position toward which it is biased; to prevent reenergization of said operator until said control member returns to ignition position.

9. In a modulating control device: a movably mounted valve for controlling main fuel flow and having an ignition position and a minimum flow permitting position; ignition means for said main fuel; a thermoelectric generator subject to the heat of said ignition means; an hermetically sealed enclosure having a movable portion; a condition responsive expansible and contractible fluid fill in said enclosure operable to move said movable portion during expansion and contraction of said fill; connections between said movable portion and said valve operable to move the latter in a flow reducing direction when said movable portion is moved by expansion of said fill; a first low resistance contact within said enclosure connected to and movable with said movable wall; a movably mounted second low resistance contact within said enclosure biased toward a normal retracted position, said movable portion and said first contact being movable by contraction of the fill to a position where said first contact engages said second contact when the latter is in its normal retracted position, the corresponding position of said valve connection upon said contact engagement defining the ignition position of said valve, means magnetically latching said contacts together when moved into engagement, said contacts after engagement being movable together as a unit away from said retracted position against the bias of said second contact with said movable portion during expansion of said fill; a stop limiting said unitary movement and causing disengagement of said contacts upon predetermined movement of said valve in a flow reducing direction and thereby defining said minimum flow permitting position, said second contact upon disengagement being returned to the normal retracted position toward which it is biased; and an electroresponsive valve operator a low resistance circuit connecting said operator and said contacts with said thermoelectric generator for energization of said operator by current from said generator, said operator having a deenergized valve closing position and having an energized valve opening position, said operator being deenergized by disengagement of said contacts or by failure of said ignition means.

10. In a modulating flow-controlling device: an electroresponsive operator having an armature movable between a first position to which it is moved by energization of said operator and a second position to which it is moved by deenergization of said operator, said operator also having a resilient arm connected to said armature for movement therewith; a flow-controlling member carried by said arm and biased by said arm toward a first flow-permitting position upon energization of said operator, said flow-controlling member also being movable by said arm to a flow-preventing position by deenergization of said operator; and condition responsive actuating means having a member connectable with said flow-controlling member to limit the movement of said flow-controlling member toward said first flow-permitting position under the bias of said operator arm in response to a change in the condition while said operator is energized and said armature is in said first position, thereby deforming said resilient arm, said actuating member being movable in the opposite direction in response to an opposite change in the condition to permit flow-increasing movement of said flow-controlling member under the bias of said deformed operator arm, thereby providing modulation of said flow-controlling member in accordance with the condition.

11. In a modulating flow-controlling device: an electroresponsive operator having an armature movable between a first position to which it is moved by energization of said operator and a second position to which it is moved by deenergization of said operator, said operator also having a resilient arm connected to said armature for movement therewith; a flow-controlling member carried by said arm and biased by said arm toward a first flow-permitting position upon energization of said operator, said flow-controlling member also being movable by said arm to a flow-preventing position by deenergization of said operator; condition responsive actuating means having a member connectable with said flow-controlling member to limit the movement of said flow-controlling member toward said first flow-permitting position under the bias of said operator arm in response to a change in the condition while said operator is energized and said armature is in said first position, thereby deforming said resilient arm, said actuating member being movable in the opposite direction in response to an opposite change in the condition to permit flow-increasing movement of said flow-controlling member under the bias of said deformed operator arm, thereby providing modulation of said flow-controlling member in accordance with the condition; and contact means connected to said actuating member and in the power circuit for said operator, said means interrupting the flow of current to said operator when said flow-controlling member is moved in a flow-reducing direction past a predetermined minimum flow-permitting position, thereby causing said operator to move said flow-controlling member to flow-preventing position, said contact means also preventing the flow of current to the deenergized operator until the actuating member is in a position to permit the operator to move the flow-controlling member to said first flow-permitting position upon reenergization.

12. A condition responsive control apparatus comprising: a sealed chamber having a condition responsive fill and having a portion movable with expansion and contraction of said fill in response to the condition; a first low resistance contact member biased to a first position; a second low resistance contact member connected to the movable portion of said chamber and movable therewith, said contact member being movable into engagement with said first contact member when the latter is in its first position; a low resistance circuit including a thermo-electric generator affording a source of electrical energy under the control of said low resistance contact members; electromagnetic valve means in said circuit energized by thermo-electric current from said source when said contact members are in engagement, said valve means being movable to flow permitting position when energized, means magnetically latching said contact members together when moved into engagement, said contact members when in engagement being movable as a unit away from said first position against the bias of said first contact with movement of the movable portion of said chamber in response to changes in the condition; and a stop limiting said unitary movement of said contact members beyond a limit, further movement of said movable portion of said chamber beyond said limit effecting disengagement of said contacts and deenergization of said electromagnetic valve means, said first contact member thereupon returning to said first position under its said bias, wherefor reenergization of said valve means and movement thereof to flow permitting position is impossible until said second contact member is again moved into engagement with said first contact member at the latter's first position by movement of said movable chamber portion with a change in the condition.

13. Condition responsive control apparatus comprising: a burner for burning main fuel; ignition means for said burner; a thermoelectric generator subject to the heat of said ignition means; a sealed chamber having a condition responsive fill and having a portion movable with expansion and contraction of said fill in response to the condition; a first contact member within said chamber and biased to a first position; a second contact member within said chamber movable into engagement with said first contact member when the latter is in its first position; a circuit including said thermoelectric generator and under the control of said contact members; electromagnetic valve means in the fuel supply line to said burner and having an operator in said circuit energized by current from said generator when said contact members are in engagement, said valve means being movable to flow permitting position when its operator is energized and to flow preventing position when its operator is deenergized, said contact members when in engagement being movable as a unit away from said first position with movement of the movable portion of said chamber in response to changes in the condition; and a stop limiting said unitary movement of said contact members beyond a limit, further movement of said movable portion of said chamber beyond said limit effecting disengagement of said contacts and deenergization of the operator of said electromagnetic valve means, said first contact member returning to said first position under its said bias, wherefor energization of said valve means to flow permitting position is impossible until said second contact member is again moved into engagement with said first contact member at the latter's first position by movement of said movable chamber portion with a change in the condition, said electromagnetic valve means being deenergized unless said ignition means is operative to heat said generator, thereby affording a shut-off of said main fuel unless said ignition means is operative.

14. A condition responsive control apparatus comprising: condition responsive control means including a sealed chamber having a condition responsive fill and having a portion movable with expansion and contraction of said fill in response to the condition; fuel control valve means under the control of said condition responsive means movable by the latter in a flow reducing direction in response to expansion of the fill to provide modulation of the fuel flow in accordance with the condition; a first contact member biased to a first position; a second contact member connected to said movable portion for movement therewith and being movable into engagement with said first contact member when the latter is in its first position; a circuit including a source of electrical energy under the control of said contact members; electromagnetic control means in said circuit energized from said source when said contact members are in engagement, said valve means also being under the control of said electromagnetic control means, said valve means being movable to a flow permitting position by the electromagnetic means when the latter is energized and to a flow preventing position by said electromagnetic means when the latter is deenergized, means magnetically latching said contact members together when moved into engagement, said contact members when in engagement being movable as a unit away from said first position and against the bias of said first contact with movement of the movable portion of said chamber in response to expansion of the fill; and a stop limiting said unitary movement of said contact members beyond a limit and defining a minimum safe flow permitting position of said valve means, further movement of said movable portion of said chamber beyond said limit effecting disengagement of said contacts with consequent deenergization of said electromagnetic control means and closure of said valve means, said first contact member returning to said first position under its said bias, wherefor energization of said electromagnetic control means and movement of said valve means to flow permitting position is impossible until said second contact member is again moved into engagement with said first contact member at the latter's first position by movement of said movable chamber portion with an opposite change in the condition.

15. A condition responsive control apparatus comprising: a burner for burning main fuel; ignition means for said burner; a thermoelectric generator subject to the heat of said ignition means; condition responsive control means including a sealed chamber having a condition responsive fill and having a portion movable with expansion and contraction of said fill in response to the condition; fuel control valve means under the control of said condition responsive means and movable in a flow reducing direction in response to expansion of the fill to provide modulation of the fuel flow in accordance with the condition; a first contact member within said chamber biased to a first position; a second contact member within said chamber movable into engagement with said first contact member when the latter is in its first position; a circuit including said generator under the control of said contact members; electromagnetic control means in said circuit energized by current from said generator when said contact members are in engagement, said valve means also being under the control of said electromagnetic control means, said valve means being movable to flow permitting position when the electromagnetic means is energized and to flow preventing position when said electromagnetic means is deenergized, said contact members when in engagement being movable as a unit away from said first position with movement of the movable portion of said chamber in response to expansion of the fill; and a stop limiting said unitary movement of said contact members beyond a limit and defining a minimum safe flow permitting position of said valve means, further movement of said movable portion of said chamber beyond said limit effecting disengagement of said contact with consequent deenergization of said electromagnetic control means and closure of said valve means, said first contact member returning to said first position under its said bias, wherefor energization of said electromagnetic control means and movement of said valve means to flow permitting position is impossible until said second contact member is again moved into engagement with said first contact member at the latter's first position by movement of said movable chamber portion with an opposite change in the condition, energization of said electromagnetic control means being also dependent upon heating of said generator by said ignition means, thereby providing shut-off of the fuel unless said ignition means is operative.

16. In a control device: a movably mounted control member for controlling main fuel flow and having an ignition position and a minimum flow permitting position; ignition means for said main fuel; a thermoelectric generator subject to the heat of said ignition means; an hermetically sealed enclosure having a movable portion; a condition responsive expansible and contractible fluid fill in said enclosure operable to move said movable portion during expansion and contraction of said fill; connections between said movable portion and said control member operable to move the latter in a flow reducing direction when said movable portion is moved by expansion of said fill; a pair of cooperating contacts within said enclosure positioned in engagement when said control member is in said ignition position, one of said contacts being connected to and movable with said movable portion, and said contacts being positioned for disengagement upon expansion of said fill and movement of said movable portion tending to move said control member in a flow reducing direction past said minimum flow permitting position; an electro-responsive control member operator connected in circuit with said contacts and with said thermoelectric generator for energization by the latter; and an overcalling condition responsive control device in said circuit operable to prevent the flow of thermoelectric current to said operator and deenergize the latter in response to a predetermined condition, said operator having an energized flow permitting position and deenergized flow preventing position.

References Cited in the file of this patent

UNITED STATES PATENTS

| | | | |
|---|---|---|---|
| 360,823 | Singer | Apr. 5, | 1887 |
| 1,121,635 | Kitchen | Dec. 22, | 1914 |
| 1,186,770 | Hallock | June 13, | 1916 |
| 1,265,765 | Ferris | May 14, | 1918 |
| 1,754,349 | Bruhlmann | Apr. 15, | 1930 |
| 1,827,430 | Greenwood | Oct. 13, | 1931 |
| 2,214,558 | Kronmiller | Sept. 10, | 1940 |
| 2,227,447 | Fisher | Jan. 7, | 1941 |
| 2,349,443 | McCarty | May 23, | 1944 |
| 2,447,894 | Bauman | Aug. 24, | 1948 |